No. 658,767. Patented Oct. 2, 1900.
M. L. E. DUVAL.
AUTOMATIC BRAKE FOR RAILWAYS.
(Application filed June 8, 1898.)

(No Model.) 3 Sheets—Sheet 1.

WITNESSES:

INVENTOR
Martin L. E. Duval
BY
ATTORNEYS.

No. 658,767. Patented Oct. 2, 1900.
M. L. E. DUVAL.
AUTOMATIC BRAKE FOR RAILWAYS.
(Application filed June 8, 1898.)

(No Model.) 3 Sheets—Sheet 2.

WITNESSES:
W. R. Edelen

INVENTOR
Martin L. E. Duval
BY
ATTORNEYS.

No. 658,767. Patented Oct. 2, 1900.
M. L. E. DUVAL.
AUTOMATIC BRAKE FOR RAILWAYS.
(Application filed June 8, 1898.)

(No Model.) 3 Sheets—Sheet 3.

UNITED STATES PATENT OFFICE.

MARTIN LEONARD EDMOND DUVAL, OF PARIS, FRANCE, ASSIGNOR TO LA COMPAGNIE DE FIVES LILLE, OF SAME PLACE.

AUTOMATIC BRAKE FOR RAILWAYS.

SPECIFICATION forming part of Letters Patent No. 658,767, dated October 2, 1900.

Application filed June 8, 1898. Serial No. 682,959. (No model.)

*To all whom it may concern:*

Be it known that I, MARTIN LEONARD EDMOND DUVAL, a resident of Paris, in the Republic of France, have invented a new and useful Improvement in and Relating to Automatic Brakes for Railways, which is fully set forth in the following specification.

With pneumatic brakes of the ordinary kind the application of the brakes to the wheels of the vehicles is effected by producing in the general air-conduit arranged beneath the carriages a reduction of pressure, which is obtained by opening a cock arranged upon the locomotive under the control of the driver. It will readily be understood that with trains composed of a large number of vehicles, owing to the length of the air-conduit, the braking operation occupies an appreciable space of time as the volume of air which has to be extracted from the conduit passes out through a single aperture, the section of which is necessarily limited to the diameter of the conduit itself. In the "Fives-Lille" system, substantially as shown in United States Patents No. 570,870, dated December 12, 1893, and No. 486,703, dated November 22, 1882, and as partly illustrated herein in connection with this invention, the reduction of pressure required to be produced does not, it is true, exceed seven hundred and fifty kilograms, and notwithstanding the great length of the conduit a complete braking is effected in a period of from six to seven seconds, which is relatively short. Circumstances may, however, render it desirable to effect the braking in the shortest possible space of time; but it is absolutely necessary that the operation should be effected under conditions such that no injurious action upon the couplings of the various vehicles composing the train is liable to result therefrom.

This invention relates to a device for enabling the whole of the vehicles composing railway-trains to be rapidly and simultaneously braked.

My invention is represented, by way of example, in the accompanying drawings, in which—

Figure 1:
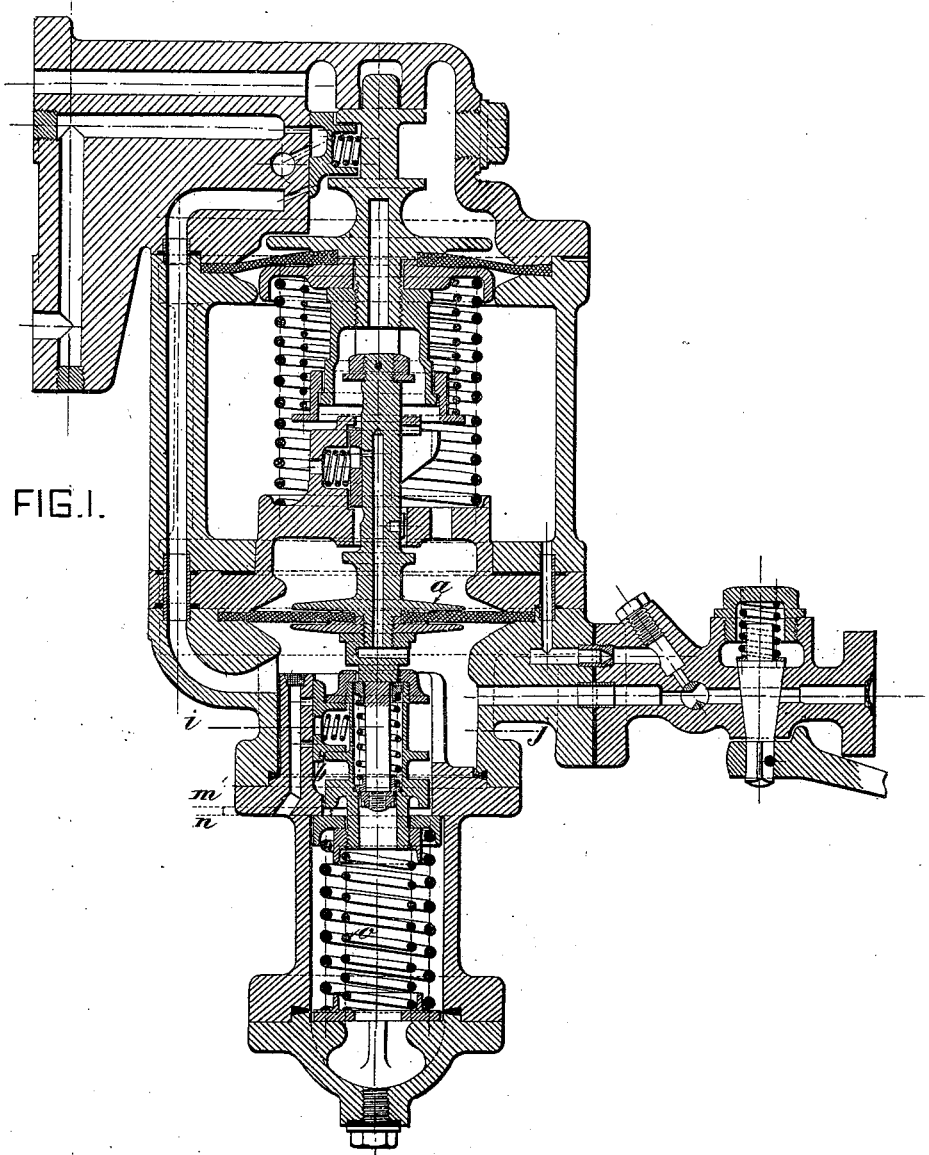
Figure 4:
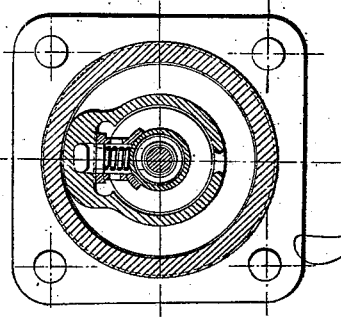
Figure 3:
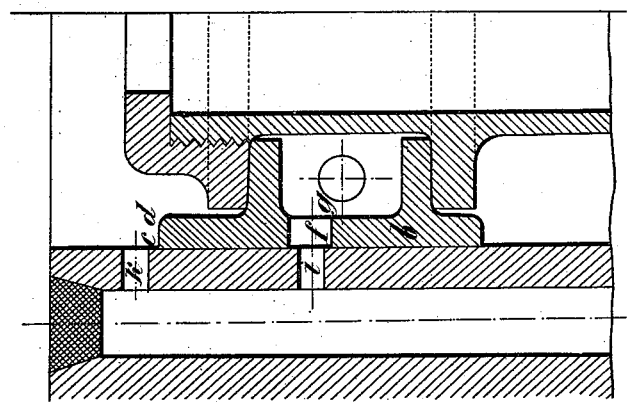
Figure 2:
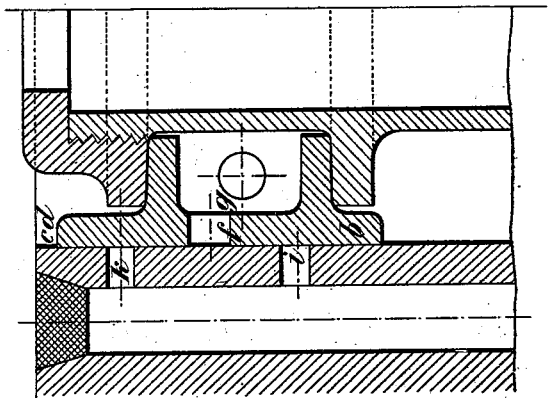
Figure 6:
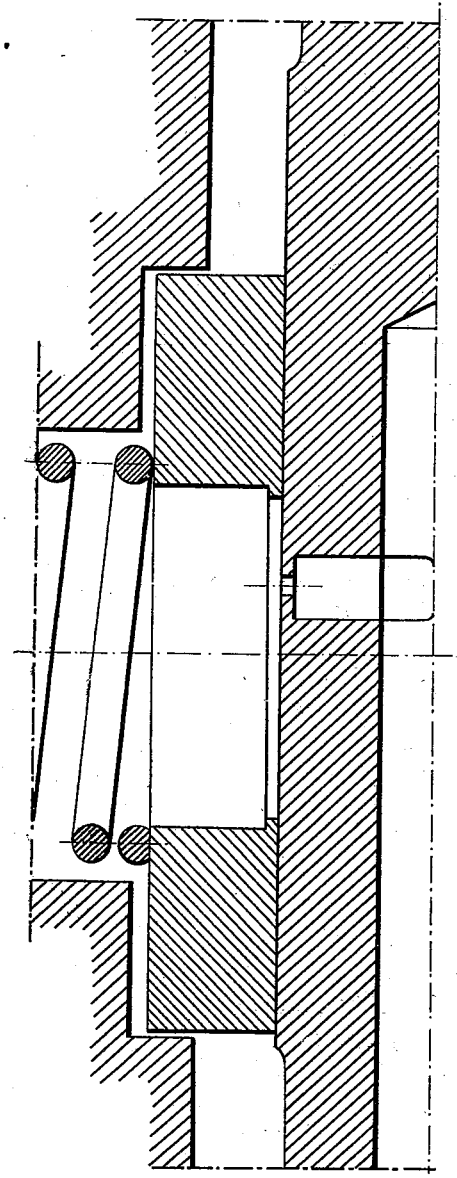
Figure 5:
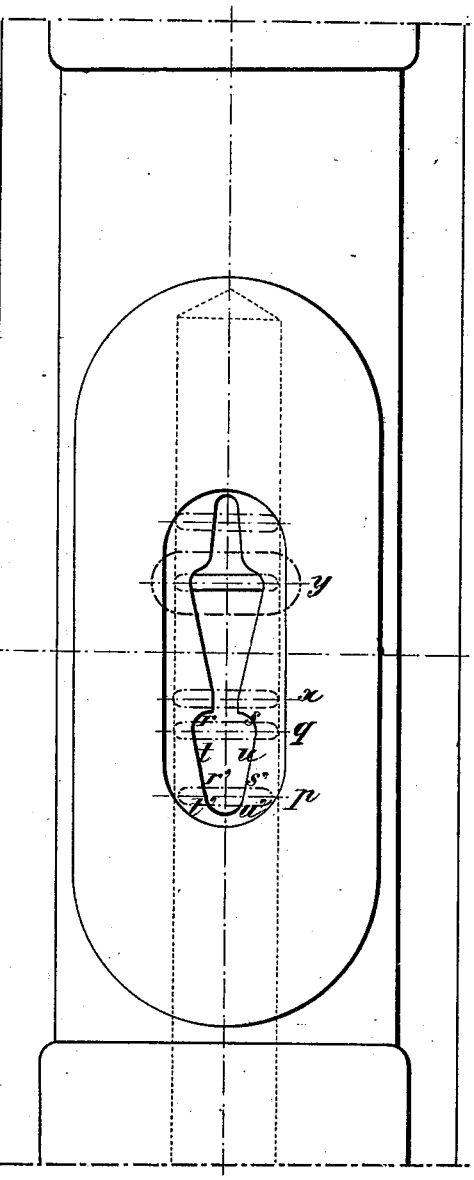

Figure 1 is a vertical section through my distributer provided with the said device. Figs. 2 and 3 show, upon a larger scale, the constructional details of the parts by means of which the speedy braking is effected. Fig. 4 is a horizontal section upon the line $ij$ of Fig. 1. Figs. 5 and 6 represent in elevation and in section, respectively, the parts by means of which simultaneous braking of all vehicles is effected.

Upon the central rod of the diaphragm $a$ of the supply-regulator of the Fives-Lille system is attached a slide-valve $b$, having a double aperture, Figs. 1, 2, 3, and 4, which valve occupies the position indicated in Figs. 1 and 2 while the train is running normally. When the brakes are fully applied in the ordinary manner, the slide-valve $b$ is operated by the descending movement of the diaphragm-rod; but its travel is limited in such a manner that the faces or bridge portions $c$ $d$ and $fg$ do not uncover the corresponding orifices $k$ and $i$ for exhaust into the outer air, and consequently no acceleration in the reduction of air-pressure in the conduit is produced. The travel or stroke of the slide-valve is in this case equal to the distance $m\,n$. (See Fig. 1.) The edge $m$ of the circular nose of the operating-rod of the slide-valve touches the supporting-washer $n$, which is held in position by the external spring $o$, the initial tension of which is regulated in such a manner that the thrust of the diaphragm is less than such tension when the brakes are fully applied under ordinary circumstances.

In order to effect a speedy application of the brakes, a very considerable reduction of pressure in the general conduit is produced by completely opening the actuation-cock. The thrust or impulse of the diaphragm $a$ is then sufficient to cause the spring $o$ to yield and effect the opening of the orifices $k$ and $i$ for exhaust into the atmosphere in the leading vehicles of the train. The reduction of pressure is at once transmitted with great rapidity in the conduit from vehicle to vehicle from the front to the rear of the train, and the braking is thus effected in a very short space of time.

Notwithstanding the extreme rapidity with which the reduction of pressure caused by the successive openings of the slide-valves for exhaust into the atmosphere is propagated the complete braking of the vehicles forming the front portion of the train would be effected more rapidly than that of those in the rear, whereby the production of abnormal reactions presenting elements of danger would be rendered liable, more especially when a rapid braking was effected upon a train traveling at a moderate speed. In order to effect such braking operations with the degree of simultaneity which is desirable, I attach the exhaust-valve $b$ to the rod carrying the slide $c$ of the regulator, the orifices of which (indicated in Figs. 5 and 6) are completed by the addition of a lower portion $p\ q$, corresponding to the supplemental stroke during which the acceleration takes place. In the front vehicles, where the reduction of pressure in the conduit is extremely rapid, the rod is immediately driven to the end of its stroke, and orifice of reduced section $r'\ s'\ t'\ u'$ only remains open. In the other vehicles the sections of the orifice open increase progressively and present toward the rear of the train the section $r\ s\ t\ u$, which is slightly greater than the previous section, and it will be understood that these sections and the strength of the counteracting supporting-springs may be determined by experiment in such a manner as to cause the rapid braking to be as simultaneous in its action as in the case of an ordinary application of the brakes.

The device described above is distinguished from those hitherto known, although presenting a certain analogy with them, by the following characteristics: First, by the double orifice for exhaust into the atmosphere, enabling an air-passage of large section to be secured with a relatively-small diaphragm stroke; second, by its combination with the Fives-Lille form of supply-regulator, and, third, by the important advantage which it presents of being always ready to act, the slide-valve being frequently operated during ordinary braking operations. Owing to this no leakage or adherence to the sliding surface need be apprehended, which would certainly not be the case were the operation suspended for any length of time.

It should be remarked that one portion $x\ z$ of the orifice of the regulator slide-valve is applied in ordinary braking operations and the upper portion in the releasing operations. It will thus be seen that under these conditions the supply-regulator exerts its regulating action, first, upon the ordinary braking operations and releasing operations while the train is running, and, second, upon rapid braking operations.

Having now particularly described and ascertained the nature of my said invention and in what manner the same is to be performed, I declare that what I claim is—

1. In a distributer for air-brake appliances, the combination with means adapted to be actuated by variations in train-pipe pressure for controlling communication between the train-pipe, auxiliary reservoir and brake-cylinder, of a reciprocatory rod and means for reciprocating the same in accordance with variations in train-pipe pressure in making ordinary service as well as emergency applications of the brakes, two or more ports at the distributer leading to the atmosphere through which the train-pipe is adapted to exhaust in making emergency applications of the brakes, a valve for simultaneously opening and closing said ports connected to the rod so as to be movable therewith during ordinary or service braking operations, but so disposed as to open said ports only upon extreme movement of the rod in making quick action or emergency stops.

2. In a distributer for air-brake appliances, the combination with means actuated by variations in train-pipe pressure for controlling communication between the train-pipe, auxiliary reservoir and brake-cylinder, said means comprising an actuating part—such as a diaphragm—of a passage of variable area through which said diaphragm is exposed to train-pipe pressure, a regulating-rod acting automatically to vary the area of said passage as the pressure in the train-pipe fluctuates, a second diaphragm directly exposed to train-pipe pressure for actuating said rod, a port leading from the train-pipe side of said second diaphragm to the atmosphere, a valve for opening and closing said port connected to and movable with the rod during both service and emergency operations of the brakes, but so disposed as to open the port only upon the extreme movements of the rod in emergency operations.

3. In a distributer for air-brake apparatus, the combination with a triple valve for controlling communication between the train-pipe, auxiliary reservoir and brake-cylinder, means adapted to be actuated by fluctuations in train-pipe pressure for operating the triple valve, a regulating-rod, means—such as a diaphragm—directly exposed to train-pipe pressure for operating said rod according to fluctuations in train-pipe pressure, a seat against which the rod slides, and an orifice or passage through which the triple-valve-operating means is exposed to train-pipe pressure, said orifice being formed through the rod and its seat by an opening in one of said parts of such size as to be capable of registering with a part only of one of three triangular openings through the other part, said three openings corresponding respectively to the service application, emergency application and release of the brakes.

In testimony whereof I have signed this specification in the presence of two subscribing witnesses.

MARTIN LEONARD EDMOND DUVAL.

Witnesses:
EDWARD P. MacLEAN,
ANTOINE ROUSSANNES, Jr.